(12) United States Patent
Eberle et al.

(10) Patent No.: US 8,210,569 B2
(45) Date of Patent: Jul. 3, 2012

(54) BELT TENSIONER FOR A SEAT BELT SYSTEM

(75) Inventors: Walter Eberle, Hochdorf (DE); Till Heinrich, Esslingen (DE)

(73) Assignee: Daimler AG, Stuttgart (DE)

( * ) Notice: Subject to any disclaimer, the term of this patent is extended or adjusted under 35 U.S.C. 154(b) by 250 days.

(21) Appl. No.: 12/514,750

(22) PCT Filed: Aug. 21, 2007

(86) PCT No.: PCT/EP2007/007347
§ 371 (c)(1),
(2), (4) Date: Feb. 1, 2010

(87) PCT Pub. No.: WO2008/058580
PCT Pub. Date: May 22, 2008

(65) Prior Publication Data
US 2010/0141011 A1   Jun. 10, 2010

(30) Foreign Application Priority Data
Nov. 14, 2006   (DE) .......................... 10 2006 053 563

(51) Int. Cl.
*B60R 22/46* (2006.01)
(52) U.S. Cl. ........................................ 280/806; 297/480
(58) Field of Classification Search .................. 297/480; 280/805, 806; 60/638
See application file for complete search history.

(56) References Cited

U.S. PATENT DOCUMENTS

| | | | | |
|---|---|---|---|---|
| 3,871,470 A | * | 3/1975 | Schwanz et al. | 297/480 |
| 3,891,271 A | | 6/1975 | Fieni | |
| 3,917,031 A | * | 11/1975 | Doin et al. | 188/375 |
| 5,207,618 A | * | 5/1993 | Nishizawa | 474/101 |
| 5,350,194 A | | 9/1994 | Foehl | |
| 5,671,949 A | * | 9/1997 | Bauer et al. | 280/806 |
| 5,762,372 A | * | 6/1998 | Koujiya et al. | 280/806 |
| 5,772,246 A | | 6/1998 | Gordon | |
| 6,299,211 B1 | * | 10/2001 | Wier | 280/806 |
| 6,712,394 B2 | * | 3/2004 | Betz et al. | 280/805 |
| 6,976,707 B2 | * | 12/2005 | Modinger et al. | 280/806 |
| 2002/0113425 A1 | | 8/2002 | Betz et al. | |
| 2003/0090101 A1 | * | 5/2003 | Ennerdal | 280/806 |

FOREIGN PATENT DOCUMENTS

| | | |
|---|---|---|
| DE | 2 300 119 | 1/1973 |
| DE | 297 18 659 U1 | 2/1998 |
| DE | 200 10 969 U1 | 11/2000 |
| DE | 201 02 758 U1 | 6/2001 |
| DE | 101 28 247 A1 | 2/2002 |
| EP | 0 558 963 A2 | 9/1993 |
| EP | 0 568 327 A2 | 11/1993 |
| EP | 0 911 228 A2 | 4/1999 |

* cited by examiner

*Primary Examiner* — Paul N Dickson
*Assistant Examiner* — Robert A Coker
(74) *Attorney, Agent, or Firm* — Crowell & Moring LLP (57) ABSTRACT

A vehicle seat belt tensioner comprises a traction element that transmits a tensioning force to a seat belt strap. The traction element may be formed for example of a flexible rope or a wire, or a thrust element which can transmit traction and thrust forces. A force limiting unit, which limits the retaining force exerted by the seat belt strap on a passenger has a functional element coupled to the traction or thrust element, which is displaceable by means of a displaceable piston element in the effective direction of the tensioning force. The vehicle belt tensioner according to the invention includes means for the parallel application of tensioning force to both the piston element and the traction or thrust element, concurrently.

29 Claims, 8 Drawing Sheets

BELT TENSIONER FOR A SEAT BELT SYSTEM

BACKGROUND AND SUMMARY OF THE INVENTION

This application is a national stage of PCT International Application No. PCT/EP2007/007347, filed Aug. 21, 2007, which claims priority under 35 U.S.C. §119 to German Patent Application No. 10 2006 053 563.4, filed Nov. 14, 2006, the entire disclosure of which is herein expressly incorporated by reference.

The present invention relates to a belt tensioner for a seat belt system of a vehicle, with a traction or thrust element for transmitting a tensioning force onto a seat belt strap, and with a force limiting unit for limiting the retaining force exerted on a passenger by the seat belt strap. The force limiting unit comprises a functional element coupled to the traction or thrust element, and can be displaced by means of a displaceable piston element in the effective direction of the tensioning force.

To increase the protective effect of a seat belt retention system, it is known to provide it with a belt tensioner, which withdraws the belt slack from the seat belt during an impact, so as to shorten it and/or to draw a passenger towards the backrest of the vehicle seat into a position with a reduced danger of injury. Belt tensioners, which are integrated in an automatic belt winding apparatus, and belt tensioners cooperating with a belt buckle or an end fitting of the seat belt system are known.

Belt force limiting devices are also known in connection with a seat belt system, which serve to limit the retention force acting on the passenger caught or retained by the seat belt strap to a certain extent in the case of a crash, so as to reduce the danger of an injury to the passenger by the seat belt strap.

Figure 9:
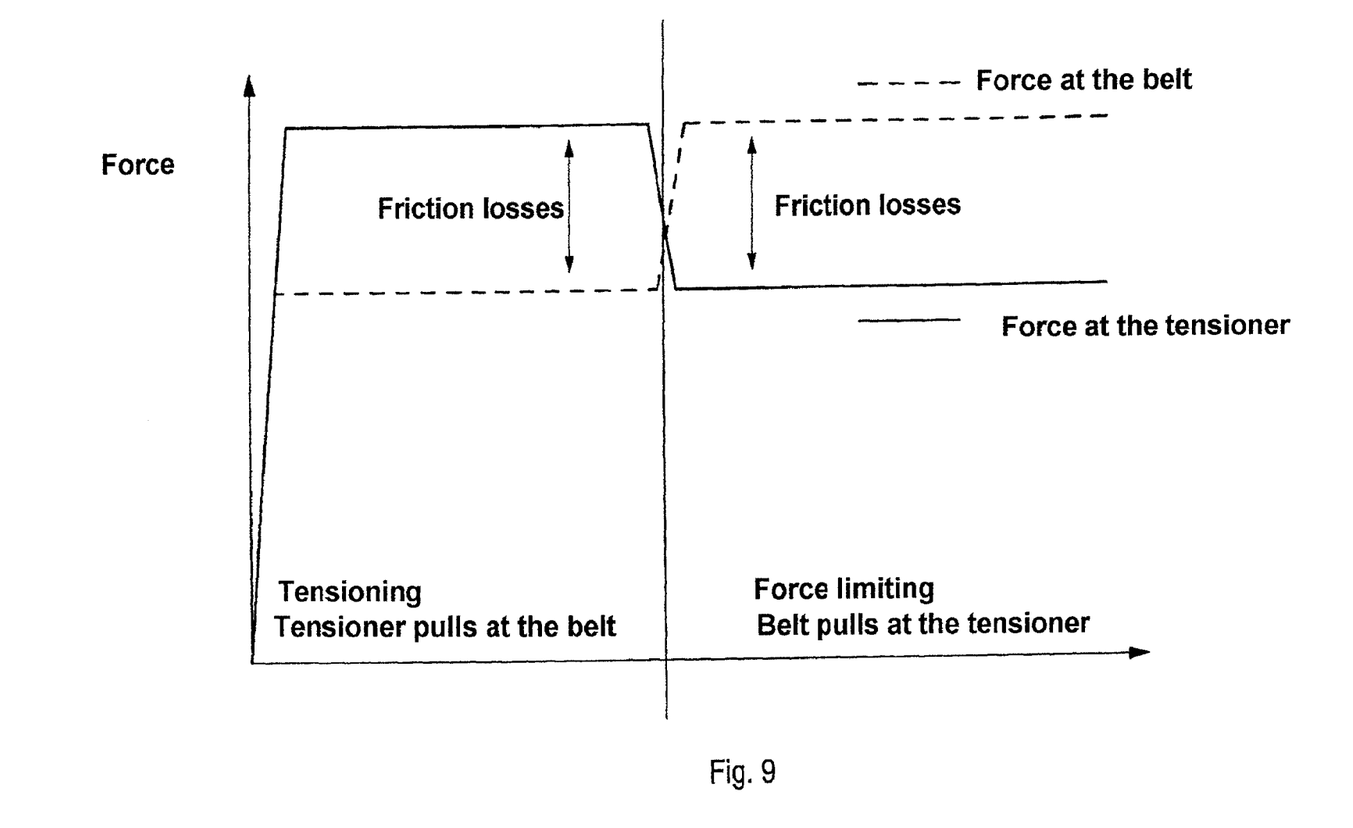
FIG. 9 is a diagram of a generic belt tensioner, in which a characteristic is applied respectively for the force acting in the seat belt strap, and a force generated by the belt tensioner.

In present-day vehicles belt tensioners are used amongst others, in which the seat belt strap is tensioned by the force limiting unit; that is, the function of the force limiting unit is superimposed over the one of the belt tensioner. In this design, the force limiting unit is released with an activated belt tensioner and when the force limiting level given by the force limiting unit is exceeded. It is thus possible that the force limiting unit already releases during the belt tensioning process, so that the seat belt strap is not tensioned to the desired extent. Such a belt tensioner provided with a force limiting unit is disclosed, for example, in German patent document DE 297 18 659 U1. It is disadvantageous with these belt tensioners, that the maximum tensioning force, which can be realized, and which is transmitted to the seat belt strap, cannot be adjusted arbitrarily, but must be considerably smaller than the release force of the force limiting unit. The reason for this is that, due to the deflection of the seat belt strap at a belt deflector in the region of about 90° to 150°, and the deflection of a traction or thrust element (which is coupled to a belt buckle or end fitting at one end, and to the belt tensioner at its other end), strong forces act in the seat belt strap in a crash, which leads to high friction losses at the deflections, as can be seen in the diagram of FIG. 9. The friction losses, which are in the region of about 20% to 40% of the tensioning force, double due to the reversal of direction (belt traction during tensioning and belt release during force limiting), which means that the maximum tensioning force can be considerably lower than the release force of the force limiting unit. The force limiting unit would otherwise always release/be activated in any case during the belt tensioning process, which is not desired.

One object of the present invention, therefore, is to provide a belt tensioner of the above-mentioned type, in which the maximum tensioning force that can be realized in the seat belt strap is larger than, equal to, or marginally smaller than the release force of the force limiting unit, without automatically releasing the force limiting unit during the tensioning process.

This and other objects and advantages are achieved by the seat belt tensioner according to the invention, which comprises a traction element that transmits a tensioning force to a seat belt strap. (The traction element may, for example, be formed of a flexible rope or a wire, or a thrust element, which can transmit traction and thrust forces.) A force limiting unit, which limits the retaining force exerted by the seat belt strap on a passenger, has a functional element coupled to a traction or thrust element, which can be displaced by means of a displaceable piston element in the effective direction of the tensioning force. The belt tensioner includes means for the parallel charge of the piston element and the traction or thrust element with the tensioning force.

Unlike the known belt tensioner, the tensioning force generated by means of a spring brake (a preferably pyrotechnical gas generator or the like) does not act solely on the piston element. Rather, it is divided into partial forces, a first of which charges the piston element in the effective direction of the tensioning force, while the second partial force simultaneously charges the traction or thrust element in the effective direction of the tensioning force. The first partial force transmitted via the piston element to the force limiting unit has only such a size that a premature release of the force limiting unit during the tensioning process by the forces caused by the belt tensioner can be virtually excluded. The second partial force, which also contributes to the belt tensioning, is not transmitted to the force limiting unit, but past it, and introduced—at least indirectly—into the traction or thrust element. The belt tensioner according to the invention has the advantage that, by the simultaneously introducing the tensioning force into the force limiting unit and the traction or thrust element, a tensioning force can be generated, which acts in the seat belt strap, and which is larger than, equal to or smaller than the release force of the force limiting unit. This means that the tensioning force and force limiting levels can be chosen/adjusted independently from each other.

In a preferred embodiment of the belt tensioner, the means for simultaneously charging the piston element and the force limiting unit with the tensioning force (or with a partial tensioning forces, which correspond to the tensioning force when added together), comprise a force transmission element, which is arranged within a working chamber on the side of the piston element turned away from the functional element. According to a first embodiment of the invention, this force transmission element can be coupled continuously, that is, permanently, to the traction or thrust element. In another embodiment, the force transmission element is coupled to the traction or thrust element only during the tensioning process, and that such coupling of the force element to the traction or thrust element is cancelled during the disabling of the force limiting unit.

Other objects, advantages and novel features of the present invention will become apparent from the following detailed description of the invention when considered in conjunction with the accompanying drawings.

DETAILED DESCRIPTION OF THE DRAWINGS

Figure 1:
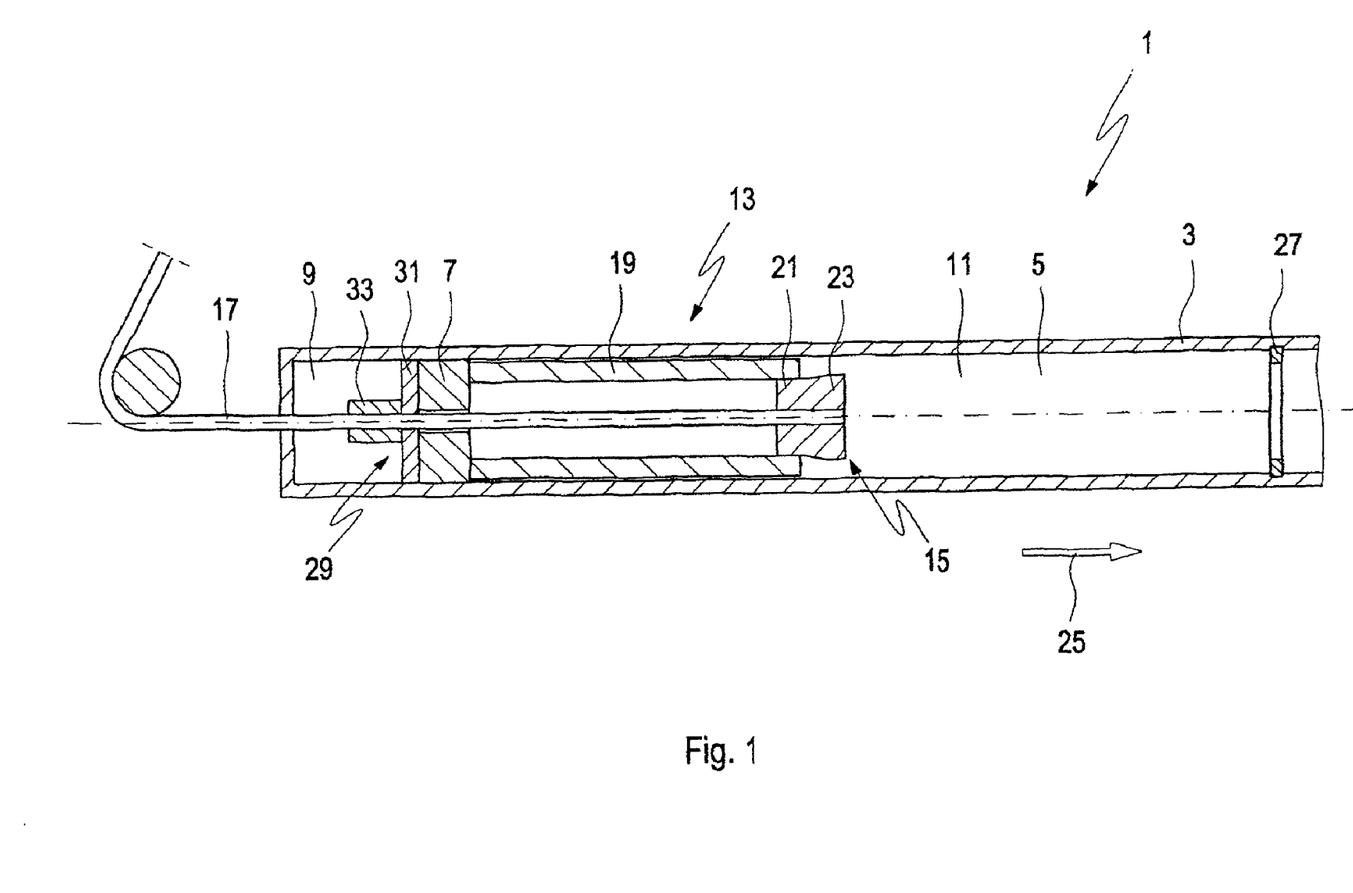
FIG. 1 shows a first embodiment of the belt tensioner according to the invention in its initial state in a schematic representation.

FIG. 1 is a schematic sectional view of an embodiment of a pyrotechnical belt tensioner 1 for a motor vehicle seat belt system (not shown). The belt tensioner 1 comprises a tubular housing 3 defining a cylindrical working chamber 5, which preferably has a circular cross section, and is divided into a first chamber 9 and a second chamber 11 by a piston element 7 arranged displaceably therein. The gap between the piston element 7 and the wall of the working chamber 5 is sealed at least substantially. A sealing arrangement (not shown) can for example be provided for this purpose. A labyrinth seal or the like can be provided as an alternative to the gap seal.

A force limiting unit integrated in the belt tensioner 1 comprises a functional element 15, which is arranged in the second chamber 11 of the working chamber 5, and rigidly connected to a traction element 17. The traction element 17, formed here by a rope, connects the functional element 15 to a belt buckle (not shown), or end fitting of the motor vehicle seat belt system. A deformation sleeve 19 is provided between the piston element 7 and the functional element 15, which sleeve abuts the face of the piston element 7 at its one end, and engages the functional element 15 with an introduction and centering section 21 at its other end. A conical displacement section 23, which increases in diameter, is added to the introduction and centering section 21.

As can be seen in FIG. 1, the traction element 17 is guided through the deformation sleeve 19 and a passage opening provided in the piston element 7. The diameter of the passage opening in the piston element 7 is chosen so that the traction element 17 reaches through it with play, and so that, with a relative movement between the traction element 17 and the piston element 7, preferably no (but at least only very low) friction forces act between the traction element 17 and the piston element 7.

When the piston element 7 is displaced in the belt tensioning direction 25, the deformation sleeve 19 and thereby also the functional element 15 and the traction element 17 fitted thereto are displaced in the belt tensioning direction 25. Due to the rigid coupling of the functional element 15 to the traction element 17, it is drawn or pushed/pressed into the working chamber 5, which results in a corresponding displacement of the belt buckle or the end fitting connected thereto, and thereby a tensioning of the seat belt strap of the seat belt system (not shown). The maximum belt tensioning path is bordered by a stop 27, against which abuts the deformation sleeve 19 at its face. The belt tensioning can alternatively also be bordered by a stop, which can be arranged, for example, in the region between the belt tensioner 1 and a deflection indicated, as a deflection roll in FIGS. 1 to 3, or in the region between the belt buckle/end fitting and the deflection.

Figure 4:
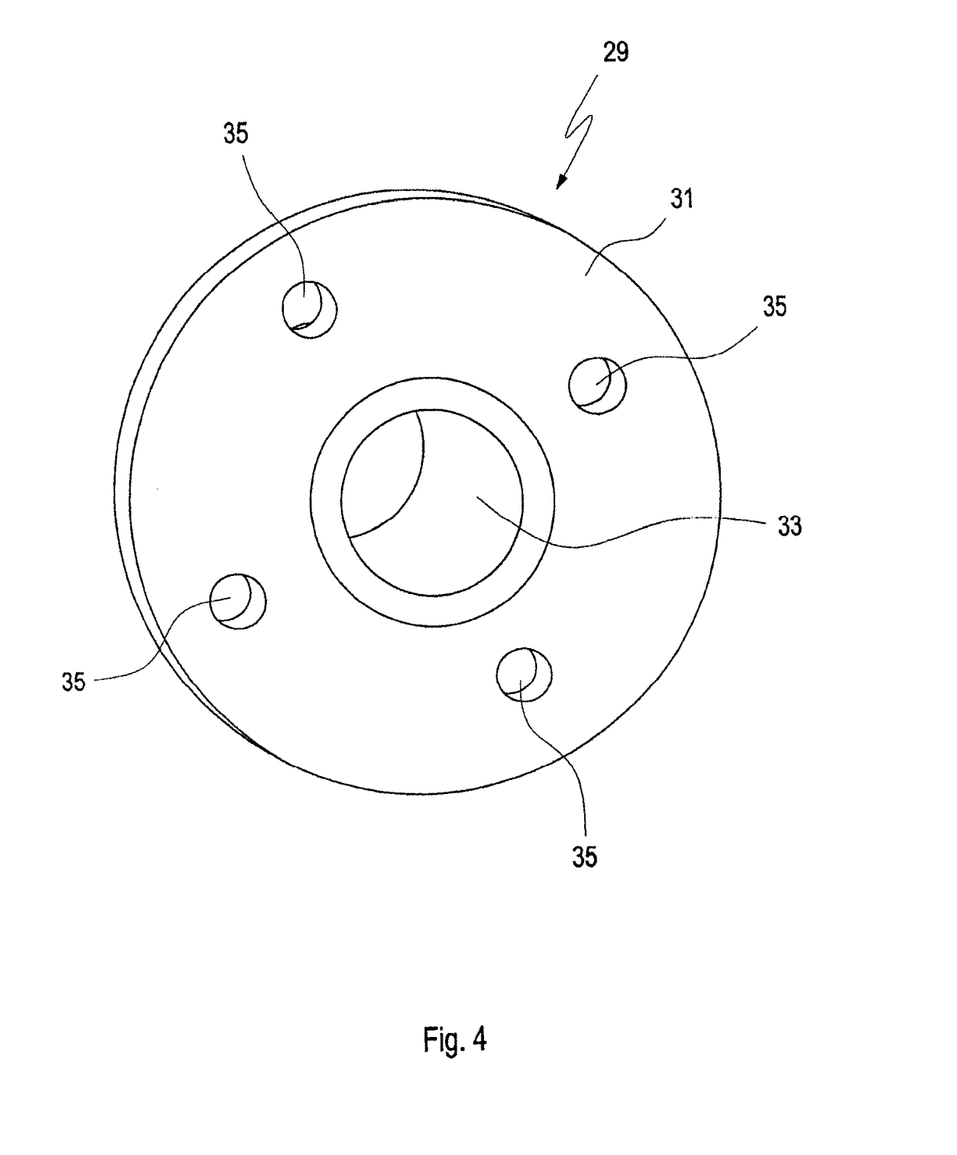
FIG. 4 is a perspective view of an embodiment of a force transmission element in the form of a pressure plate, in particular for a belt tensioner according to FIGS. 1 to 3.

The belt tensioner 1 further comprises a force transmission element 29, which is arranged on the side of the piston element 7 turned away from the functional element 15, that is, in the region of the first chamber 9. The force transmission element 29 displayed in perspective in FIG. 4 is formed by a pressure plate 31, which has a fastening sleeve 33 for connection to the traction element 17 on its side turned away from the piston element 7. The fastening sleeve 33 can for example be grouted or soldered to the traction element 17. It is important that the pressure plate 31 is coupled to the traction element 17 in a stabilized manner.

As can be seen in FIG. 4, the pressure plate 31 has altogether four gas connection channels 35 in this embodiment, the function of which will be explained further in the following. The pressure plate 31 and the fastening sleeve 33 are separate parts, which are connected to one another in a suitable manner, which enables the use of different materials. It is also conceivable to manufacture the pressure plate 31 and the fastening sleeve 33 in an integral manner, that is, as one part.

A spring element (not shown) can be provided between the piston element 7 and the deformation sleeve 19 for safe sealing during the tensioning phase and/or generation of a preliminary tension between the force transmission element 29 and the functional element 15.

The pressure plate 31 abuts the face of the piston element 7 in the initial state of the belt tensioner 1, as is shown in FIG. 1. The circumferential gap between the pressure plate 31 and the working chamber 5 is sealed in a suitable manner, for example by a sealing arrangement, so that the first chamber 9 and the second chamber 11 are separated from one another in a gas-tight manner.

To ensure that the first chamber 9 is also sealed with regard to the environment, the opening in the housing 3 for guiding through the traction element 17 is formed in a corresponding manner and/or provided with a suitable sealing arrangement.

Operation of the belt tensioner. In FIG. 1, the belt tensioner 1 is shown in its initial state/its standby position. Immediately before or after an impact of the vehicle on an obstacle, a control unit (not shown) activates the tensioning of the seat belt strap (not shown) via the belt tensioner 1 due to at least one signal generated by a sensor provided in the vehicle. For this purpose, a pyrotechnic gas generator (known per se, and not shown), which is arranged in the first chamber 9, or connected therewith via a medium connection, is ignited. The compressed gas generated by the gas generator forces the force transmission element 29, the piston element 7, and the deformation sleeve 19, with the functional element 15 arranged at its end, into the belt tensioning direction 25 (towards the right according to the representation of FIG. 1). The traction element 17, and thus the belt buckle or the end fitting, is drawn in by the displacement of these parts, which leads to a desired tensioning in the seat belt strap. The maximum tensioning path is limited by the stop 27, against which abuts the deformation sleeve 19.

Figure 2:
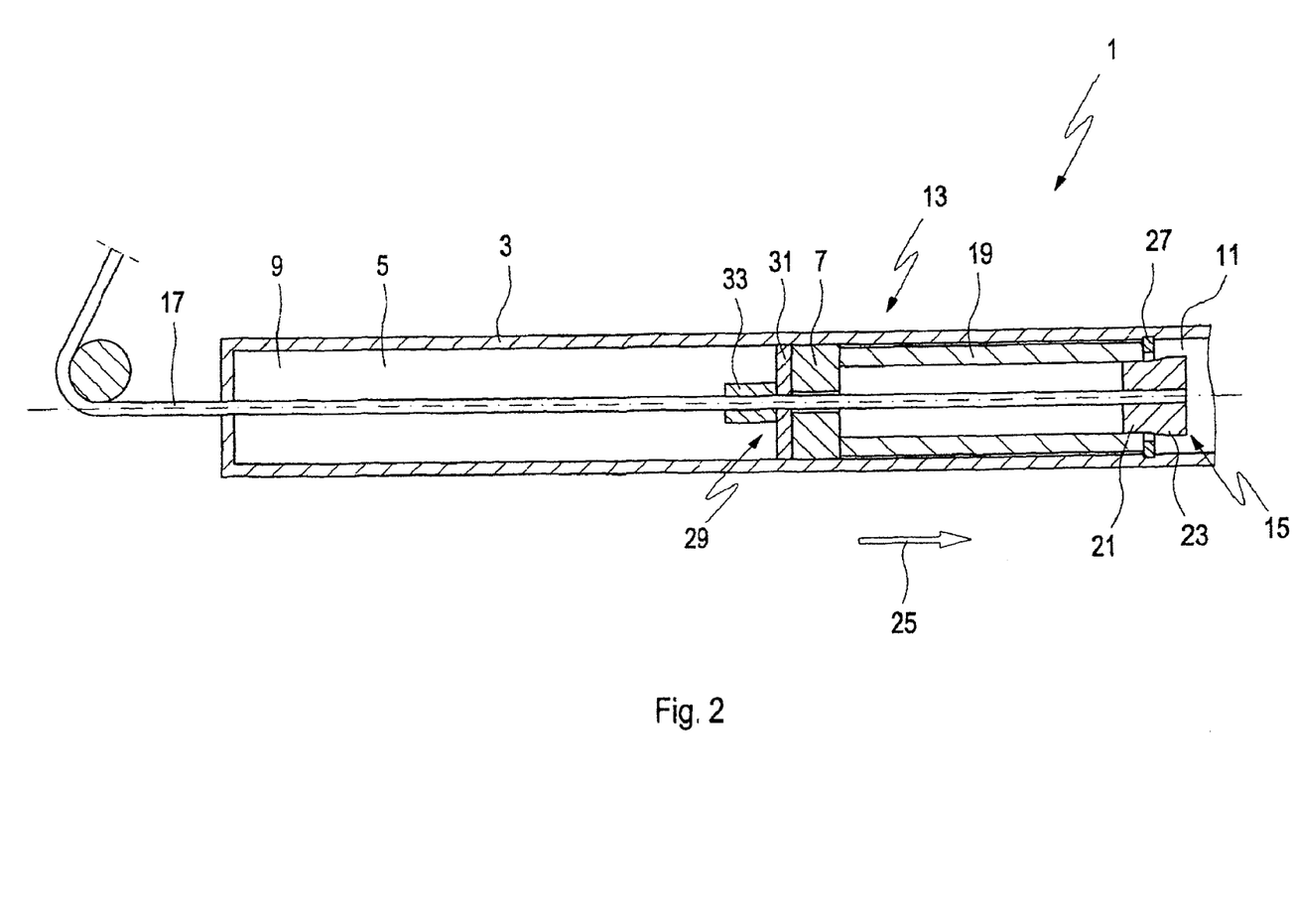
FIG. 2 is a schematic depiction of the belt tensioner according to FIG. 1 after completed belt tensioning.

The belt tensioner 1 is shown in the activated state in FIG. 2. The maximum tensioning path has been traversed; that is, the deformation sleeve 19 is moved against the stop 27. At this time, the belt slack in the seat belt strap is drawn in, and the seat belt strap lies tightly against the body of the vehicle passenger. The upper body of the vehicle passenger now starts to move forward due to the frontal impact and the vehicle deceleration. The vehicle passenger thus virtually falls into the seat belt strap. When a release force predetermined by the force limiting unit 13 is exceeded, the functional element 15 is drawn by the traction element 17 into the deformation sleeve 19. The latter is deformed correspondingly, due to the section of the functional element 15 which has a larger diameter, so that a certain resistance is set against the withdrawal of the traction element 17. This resistance is made possible, amongst other things, by the material of the deformation sleeve 19, its wall thickness, and the form of the functional element 15. It becomes apparent, that an adjustment of the release force of the force limiting unit 13 and the height and progression of the resistance force over the covered path of the functional element 15 are possible by implication by a corresponding design of the above-mentioned parts. The force progression over the path can for example be realized by a different wall thickness of the deformation sleeve 19 over its length.

It is ensured by the force limiting unit 13 that the retaining force acting on the vehicle passenger is reduced or limited, so as to prevent an excessive load thereof, while at the same time, a sufficiently high retaining effect is ensured.

Figure 3:
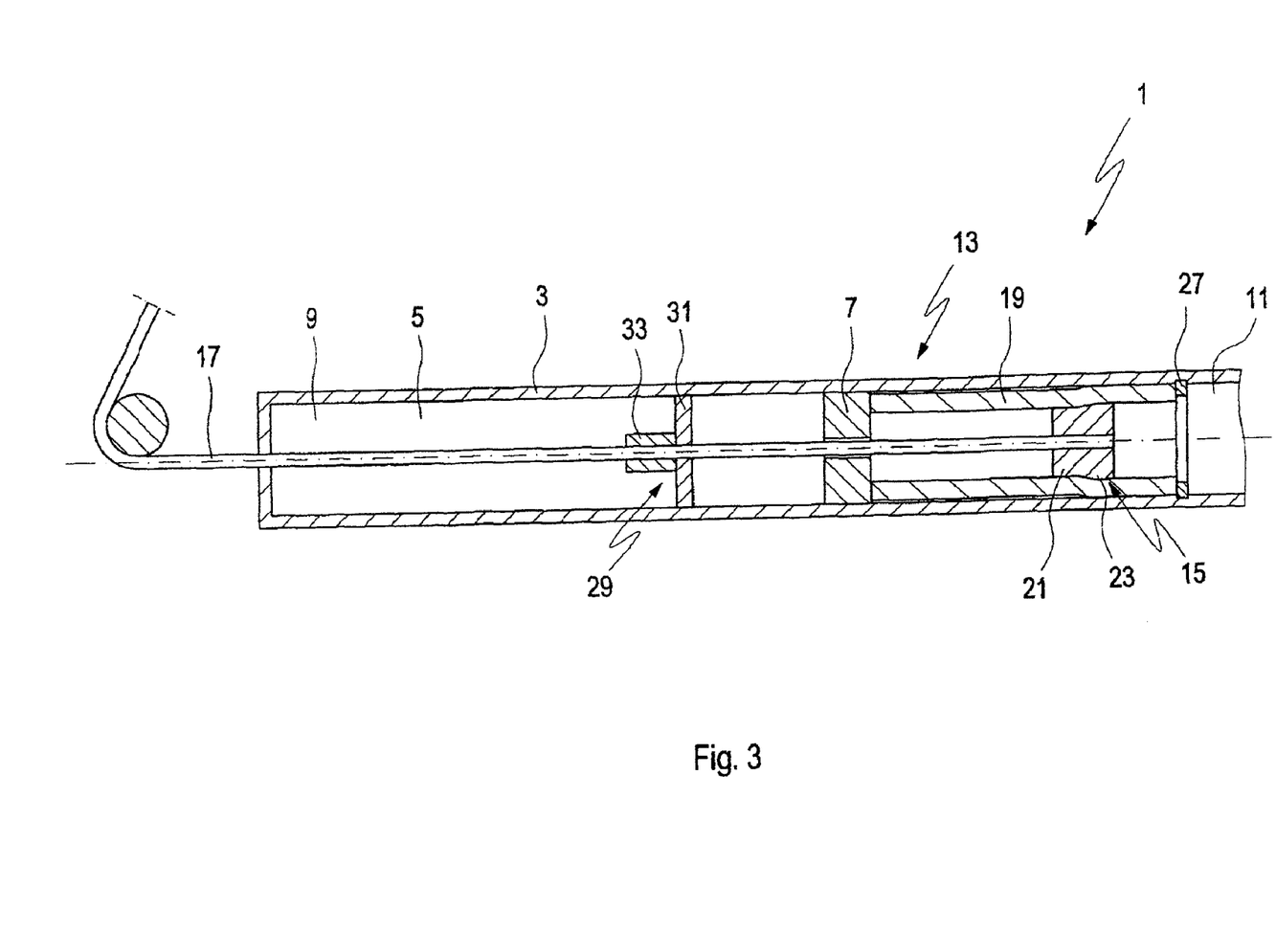
FIG. 3 is a schematic depiction of the belt tensioner according to FIG. 1 after activating an integrated force limiting unit.

In FIG. 3, the belt tensioner 1 is shown in the activated state, and with the activated force limiting unit 13. The functional element 15 is drawn approximately halfway into the deformation sleeve 19. It is displaced during a displacement of the traction element 17 against the tensioning direction 25 due to the coupling of the of the force transmission element 29 with the traction element 17. So that the pressure plate 31 is not displaced against the gas column in the first chamber 9 during this displacement, the gas connection channels 35 are provided, which enable an overflow of the gas present in the first chamber 9 to the free space that forms between the pressure plate 31 and the piston element 7. So that the functional element 15 can be drawn into the deformation sleeve 19 when a certain force level is exceeded in the seat belt strap, the piston element 7 must be fixed against an axial displacement against the tensioning direction 25 in the working chamber 5 in the instant of the release of the force limiting unit 13. For this purposes, the piston element is provided with an automatic locking apparatus (not shown), which is formed so that the piston element 7 can be displaced in the belt tensioning direction 25, but is fixed the working chamber when the direction is reversed, for example by clamping/wedging.

These locking apparatuses are known, for example from German patent documents DE 297 18 659 U1 and DE 200 10 969 U1, European patent document EP 0 911 228 B1 and German patent document DE 101 28 247 A1, the contents of which regarding the construction and function of the locking apparatus will be made the object of this description. These locking devices comprise locking elements formed by rolling elements, which are clamped against the tensioning direction during a movement of the piston element 7 (in the example of the embodiment according to FIGS. 1 to 3, to the left between the piston element 7 and the wall of the working chamber 5), and thus prevent a movement or a further movement of the piston element 7. Due to the fixation of the piston element 7 in the working chamber 5, it serves as a support/thrust bearing for the deformation sleeve 19 when the functional element 15 is drawn into it. It should be noted that the invention is not limited to the use of a previously described locking apparatus. Other suitable locking apparatuses can naturally also be used without problems, where an automatic fixation of the piston element 7 in the working chamber 5 is ensured during reversal of direction.

It should also be noted that the piston element 7 remains in a fixed position in the working chamber with the belt tensioner according to the invention, while the piston element is displaced against the force of the locking apparatus with the known belt tensioner. The belt tensioner according to the invention thus has advantages with regard to the adjustment of the desired force level.

Due to the coupling of the force transmission element 29 to the traction element 17 according to the invention, the tensioning force generated with this embodiment by means of the gas generator is simultaneously transmitted to the traction element 17 via the pressure plate 31 and its fastening sleeve 33, and (due to the abutment of the pressure plate 31 at the piston element 7) to the force limiting unit 13, or to the functional element 15 coupled to the traction element 17 via the deformation sleeve. That is—unlike the known belt tensioners—the tensioning force is introduced into the traction element 17 not only via the force limiting unit 13, but also via the force transmission element 29. This design of the belt tensioner 1 also makes it possible to realize a tensioning force which is marginally smaller than, equal to or larger than the release force of the force limiting unit 13, without releasing the force limiting unit 13 during the tensioning process.

In the embodiment shown in FIGS. 1 to 3, the parallel force introduction via the force transmission element 29 further causes the force limiting unit 13 to be already pretensioned during the tensioning process; that is in particular, the section of the traction element 17 between the force transmission element 29 and the functional element 15 is pretensioned. A force collapse during a reversal of the movement direction of the traction element 17 therefore does not take place with a corresponding dimensioning. The pretension of the force limiting unit can for example also be realized or supported by a spring element such as described above. This can be arranged in the force limiting unit in the embodiments of the belt tensioner described in FIGS. 1 to 7B, wherein the spring element is already clamped to a certain extent in the initial state of the belt tensioner 1 according to a first version of the first embodiment between the piston element 7 and the functional element 15. According to a second version it is clamped between the piston element 7 and the deformation sleeve 19; while according to a third version it is clamped between the pressure plate 31 and the piston element 7.

Figures 5A, 5B:
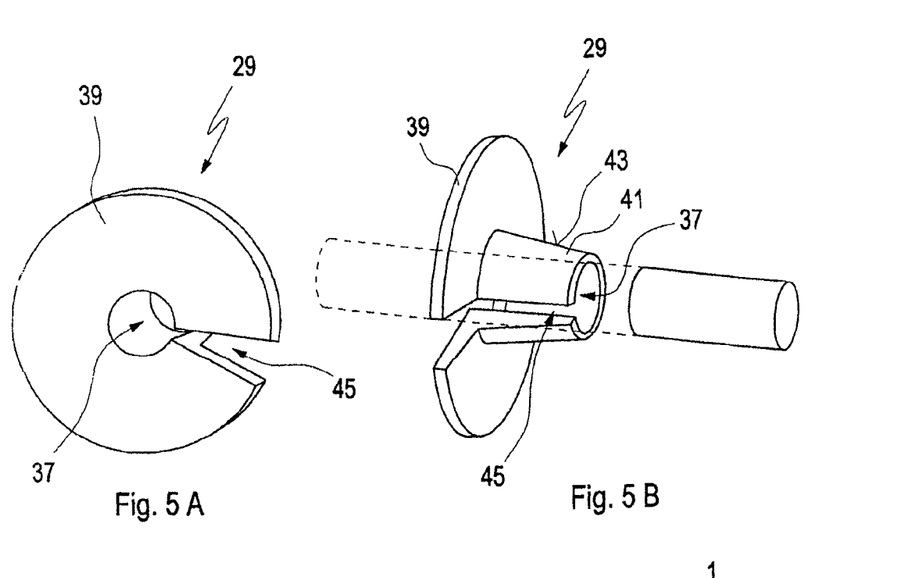
FIGS. 5A and 5B respectively are perspective views of a second embodiment of the force transmission element.

FIGS. 5A and 5B respectively show a perspective view of a second embodiment of the invention, in which the force transmission element 29 is formed by a pressure plate 39 provided with a passage 37 for the traction element 17. The plate 39 has a conical neck 41 with a conical clamping surface 43 provided circumferentially on the face turned towards the piston element 7. The pressure plate 39 and the clamping neck 41 are provided with a longitudinal slot 45 extending in the direction of its longitudinal center axis. The force transmission element 29 is formed similar to a self-clamping sleeve.

Figure 6:
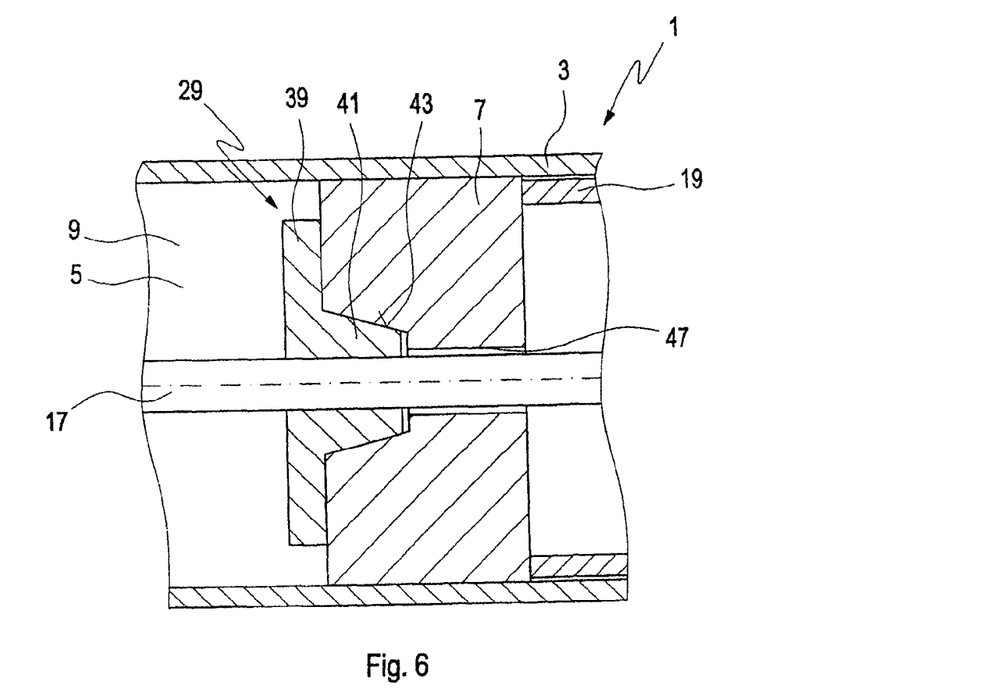
FIG. 6 shows schematically a section of a second embodiment of the belt tensioner comprising the force transmission element shown in FIGS. 5A and 5B, with the belt tensioner is shown in its initial state.
Figure 7:
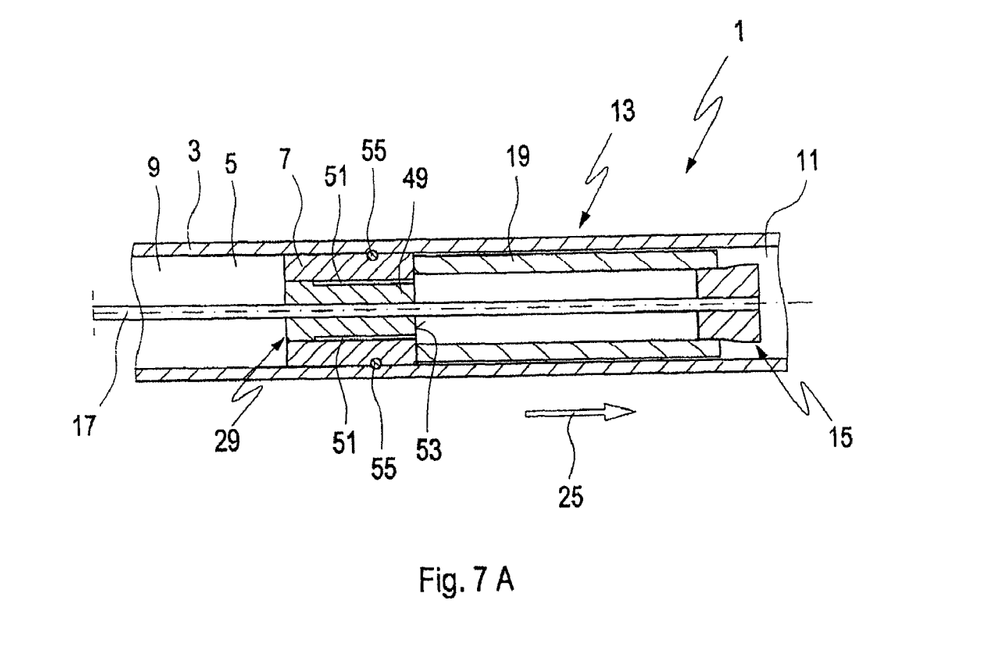
FIG. 7A is a schematic depiction of a section of a third embodiment of the belt tensioner, in its initial state.
FIG. 7B is a perspective view of a second embodiment of the force transmission element used with the belt tensioner according to FIG. 7A.

FIG. 6 shows the force transmission element 29 according to FIGS. 5A and 5B in the state where it is built into the belt tensioner 1, which has substantially the same construction as the belt tensioner 1 described by means of FIGS. 1 to 3. The fundamental difference is that the piston element 7 has a passage 47 for the traction element 17, which has a conical section that conforms to the conical neck 41 on the face turned to wards the force transmission element 29, as shown in FIG. 6. The latter is formed in such a manner that the longitudinal slot 45 (not shown in FIG. 6) is almost closed when the clamping neck 41 of the force transmission element 29 is arranged therein. The diameter of the passage 37 is reduced by pressing the slot together, whereby a clamping connection is formed between the force transmission element 29 and the traction element 17, and with the piston element 7. The force transmission element 29, which is formed as a self-clamping sleeve, is thus connected in a force-fit manner with the piston element 7 and the traction element 17, in the initial state, and shown in FIG. 6.

As can be seen in FIG. 6, the outer diameter of the pressure plate 39 in the clamped state is smaller than the inner diameter of the working chamber 5. An outer annular surface of the piston element 7 is thereby charged with compressed air when the first chamber 9 is charged with the compressed air during the belt tensioning process. The pressure plate 39 further needs space during the removal of the neck 41 from the conical recess in the piston element 7 in the radial direction, for opening the longitudinal slot 45, which takes place automatically due to the material-conditional properties of the force transmission element 29.

The embodiment of the belt tensioner described by means of FIG. 6 differs from the embodiment described by means of FIGS. 1 to 3 essentially in that the force transmission element 29 is coupled to the traction element 17 in a force-effective manner during the tensioning process, and that this force coupling is cancelled during the operation of the force limiting unit 13. This takes place in that the clamping neck 41 is withdrawn at least partially from the passage 47 in the piston element 7 during the movement reversal of the traction element 17 after releasing the force limiting unit 13, whereby the clamping sleeve widens, which leads to the cancellation of the force coupling to the traction element 17.

With the embodiment according to FIG. 6, a seal can be provided between the pressure plate 39 and the piston element 7 and/or the neck 41 and the clamping surface 43 for the compensation of position and/or component tolerances. A gas loss over this slot can thereby be safely excluded.

FIG. 7A shows a third embodiment of the belt tensioner 1. The same parts are provided with the same reference numerals, so that one refers to the previous figures in this respect. The belt tensioner 1 is shown in its initial state. The belt tensioner 1 is provided with a force transmission element 29 shown is formed by a hollow cylinder 49, as shown in a perspective view of FIG. 7B. The traction element 17 is guided through the passage opening in the hollow cylinder 49 in the installed state, and rigidly connected to the force transmission element 29 in a suitable manner. The hollow cylinder 49 is provided with a number or groove-shaped overflow openings 51 on its outer circumference surface, which are distributed over the circumference of the hollow cylinder 49. The overflow openings 51 lead into a face 53 of the hollow cylinder 49, which is turned towards the force limiting unit 13 in the installed state. The overflow openings 51 do not extend to the face of the hollow cylinder 49 turned towards the first chamber 9, so that no compressed gas can flow into the second chamber 11 via these overflow openings 51. Alternatively, the overflow openings 51 can also be realized at the piston element 7.

The force transmission element 29 (here the hollow cylinder 49) is arranged in the passage opening in the piston element 7 in the initial state of the belt tensioner 1. The outer diameter of the hollow cylinder 49 and the inner diameter of the passage opening in the piston element 7 are adjusted to one another in such a manner that a displacement of the hollow cylinder in and against the belt tensioning direction 25 is possible. The gap between the hollow cylinder 49 and the piston element 7 is sealed, for example by a sealing arrangement. The gap between the piston element 7 and the wall of the working space 5 is furthermore also sealed, wherein a corresponding sealing arrangement can also be provided here.

In the embodiment shown in FIG. 7A, locking elements 55 are further shown in the region of the outer circumference surface of the piston element 7, which are part of the previously described locking apparatus for the firmly positioned fixing of the piston element 7 in the working chamber 5 with a movement reversal of the traction element 17 after the release of the force limiting unit 13.

During the activation of the belt tensioner 1, the piston element 7 and also the hollow cylinder 49 mounted rigidly to the traction element 17, are charged with compressed gas acting in the first chamber 9. As with the previously described embodiments, the force transmission element 29, the piston element 7, the deformation sleeve 19, and the functional element 15 are thus displaced to the right in the representation according to FIG. 7A while the seat belt strap is tensioned. After the activation of the force limiting unit 13 (that is, after exceeding a predetermined force acting in the seat belt strap), the functional element 15 enters the deformation sleeve 19, causing it to be deformed. The resistance, which brings the deformation sleeve 19 towards the functional element 15, depending amongst others on the material and/or the material thickness of the deformation sleeve 19, can be predetermined correspondingly.

During the deformation of the deformation sleeve 19, the piston element 7 is fixed in the working chamber 5 in a firmly positioned manner, so that the hollow cylinder 49 forming the force transmission element 29 is withdrawn from the passage opening in the piston element 7 in the direction of the first chamber 9. After the hollow cylinder has been withdrawn slightly from the piston element 7, the overflow openings 51 at the piston element 7 connect the first chamber 9 to the second chamber 11, so that the compressed gas in the first chamber can flow over. It is thus ensured that the force transmission element 29 is not displaced against a pressure column in the first chamber 9.

All embodiments of the belt tensioner 1 described by means of the figures have in common that the pressure/tensioning force acting directly on the traction element 17 or the seat belt strap, will become ineffective during the reversal of the direction (that is, when the traction element 17 is withdrawn from the housing), which is realized by the above-described measures at the different force transmission elements, for example the overflow openings 51 in the embodiment according to FIG. 7A. If the pressure would still be effective in the first chamber 9 during the force limitation, a reproducible pressure or force level/force limitation level would not be possible.

Figure 8:
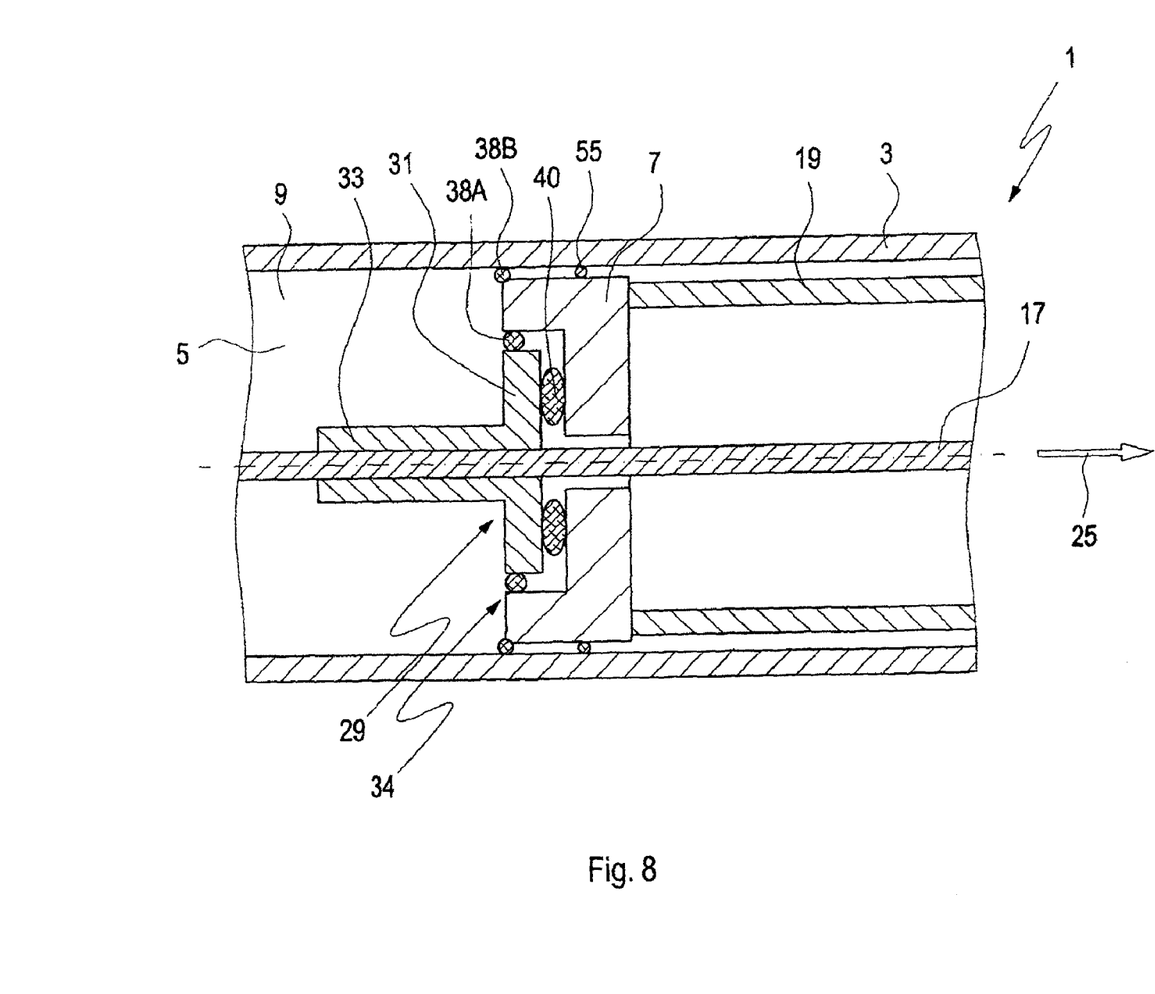
FIG. 8 is a schematic illustration of a section of a fourth embodiment of the belt tensioner, in its initial state.

FIG. 8 shows a fourth embodiment of the belt tensioner 1. The same parts are provided with the same reference numerals, so that one refers to the description of the previous figures in this respect. The belt tensioner is shown in its initial state. It can be seen that the belt tensioner according to FIG. 8 represents a combination of the embodiments according to FIGS. 1 and 7A. The force transmission element 29 is formed by the pressure plate 31, which has a fastening sleeve 33 that is coupled to the traction element 17, in particular by means of a force and/or material end connection.

In the initial state of the belt tensioner 1, the pressure plate 31 is arranged in a central recess provided at the face of the piston element 7. In this position, the flat side/face of the pressure plate 31 turned away from the piston element and the flat side/face turned towards the first chamber 9 lie—at least substantially—in a common plane, as can be seen in FIG. 8. Other arrangements of these parts are of course possible.

The outer diameter of the pressure plate 31 and the inner diameter of the passage opening in the piston element 7 are adjusted to one another in such a manner that a displacement of the pressure plate 31 in and against the belt tensioning direction 25 is possible. A sealing arrangement 34, which comprises, according to the embodiment according to FIG. 8, a first sealing element 38A arranged between the pressure plate 31 and the piston element 7, and a second sealing element 38B provided between the piston element 7 and the housing 35, serves to prevent a gas discharge during tensioning.

The tensioning force acts on the pressure plate 31 with the fastening sleeve 33, and also on the piston element 7. The arrangement is formed in such a manner that the gas can flow off between the pressure plate 31 and the piston element 7 during a reversal of the movement, so that a pressure build-up and thus an additional force is prevented during the force limitation. The second sealing element 38B prevents flowing off of the gas from the first chamber 9 into the second chamber 11. The at least one locking element 55, which is part of the locking apparatus, whose function has already been described by means of the previous figures, blocks the piston element 7 when the movement is reversed; that is, when the force limiting unit is released.

The belt tensioner further has an additional belt tensioner 1 arranged between the face of the pressure plate 31, which is turned towards the piston element 7 and the piston element 7.

The sealing elements 38A and 38B and the sealing and/or damping element 40 are hereby formed in an annular manner.

In an embodiment of the belt tensioner 1 which is not shown in the figures, a wire element is provided instead of the tubular deformation sleeve 19. The wire element can be deformed during the release of the force limiting unit 13 by displacing the functional element 15 against the belt tensioning direction 25. The wire can for example be withdrawn from a winding roll and be deformed thereby, or drawn through a narrowed opening and be tapered thereby. The force necessary for this deformation corresponds to the force limitation. In another embodiment of the invention of the belt tensioner, the functional element has at least one cutting element, which lifts a chip therefrom during the release of the force limiting unit by a relative movement with regard to a counter element, for example a separate chip sleeve, wherein the occurring chip forces represent the resistance of the force limitation. Especially the material properties, the form and the strength of the machining sleeve form the force limiting progress and thereby offer possibilities for adjusting the force limiting progress.

It is noted in summary that the belt tensioner 1 according to the invention has a simple construction and is characterized by a high functional safety.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A belt tensioner for a seat belt system of a vehicle, said belt tensioner comprising:
   a traction or thrust element for the transmission of a tensioning force onto a seat belt strap; and
   a force limiting unit for limiting the retaining force exerted onto a passenger by the seat belt strap; wherein,
   the force limiting unit comprises a functional element that is coupled to the traction or thrust element and is displaceable by a displaceable piston element in an effective direction of the tensioning force;
   a force transmission element is provided, for parallel application of the tensioning force onto the piston element and the traction or thrust element, wherein the force transmission element is arranged within a working chamber receiving the piston element.

2. The belt tensioner according to claim 1, wherein the force transmission element is arranged on a side of the piston element which faces away from the functional element.

3. The belt tensioner according to claim 1, wherein the force transmission element is formed of a pressure plate provided with a passage for the traction or thrust element.

4. The belt tensioner according to claim 3, wherein the pressure plate is fastened to the traction or thrust element.

5. The belt tensioner according to claim 3, wherein the pressure plate is provided with at least one gas connection channel extending in an axial direction.

6. The belt tensioner according to claim 3, wherein the pressure plate abuts the piston element in an unactivated state of the belt tensioner.

7. The belt tensioner according to claim 3, wherein a gap between the pressure plate and the working chamber is sealed.

8. The belt tensioner according to claim 3, wherein a venting of a first chamber of the working chamber is effective at the pressure plate during the direction reversal.

9. The belt tensioner according to claim 1, wherein the force transmission element is coupled to the traction or thrust element in a force-effective manner during a tensioning process.

10. The belt tensioner according to claim 9, wherein the force coupling between the force transmission element and the traction or thrust element is cancelled during operation of the force limiting unit.

11. The belt tensioner according to claim 9, wherein:
    the force transmission element comprises a pressure plate provided with a passage for the traction or thrust element; and
    the pressure plate has a conical neck with a conical clamping surface at an end thereof that faces towards the piston element.

12. The belt tensioner according to claim 11, wherein the pressure plate and the clamping neck are designed with a longitudinal slot.

13. The belt tensioner according to claim 9, wherein the pressure plate with its conical neck is arranged in a passage for the traction or thrust element in the piston element by clamping with the piston element and the traction or thrust element in an initial state of the belt tensioner.

14. The belt tensioner according to claim 9, wherein a sealing arrangement is provided between the pressure plate and the piston element.

15. The belt tensioner according to claim 1, wherein the force transmission element is formed as an inner piston, whose outer diameter is smaller than an inner diameter of the passage opening of the piston element.

16. The belt tensioner according to claim 15, wherein the force transmission element is arranged displaceably in the piston element in an initial state of the belt tensioner.

17. The belt tensioner according to claim 15, wherein a gap between the force transmission element and the piston element and a gap between the piston element, and the wall of the working chamber are sealed at least substantially.

18. The belt tensioner according to claim 15, wherein an overflow opening is provided at one of the force transmission element and the piston element.

19. The belt tensioner according to claim 18, wherein the overflow opening is effective during a direction reversal of the traction or thrust element after an activation of the force limiting unit.

20. The belt tensioner according to claim 1, wherein the function of the force limiting unit is superimposed on the function of the belt tensioner.

21. The belt tensioner according to claim 1, further comprising a locking apparatus which fixes the piston element in position during a displacement of the traction or thrust element against the effective direction of the tensioning force in the working chamber.

22. The belt tensioner according to claim 21, wherein said locking apparatus automatically fixes the piston element in position.

23. The belt tensioner according to claim 1, wherein:
a deformation sleeve having a passage for the traction or thrust element is provided between the piston element and the functional element; and
said sleeve can be displaceable together with the piston element in an effective direction of the tensioning force.

24. The belt tensioner according to claim 23, wherein the functional element can be drawn into the deformation sleeve while deforming it during the release of the force limiting unit.

25. The belt tensioner according to claim 1, wherein the functional element expands a deformation tube during activation of the force limiting unit.

26. The belt tensioner according to claim 1, wherein the tensioning force is larger than a release force of the force limiting unit in the region of larger than 50% and smaller than 100%.

27. The belt tensioner according to claim 1, wherein the tensioning force is equal or larger than a release force of the force limiting unit.

28. The belt tensioner according to claim 1, wherein a sealing arrangement is provided between the pressure plate and the piston element.

29. The belt tensioner according to claim 1, wherein a venting is released during a movement reversal of the tensioning process for limiting the force.

* * * * *